J. T. FERRES.
BROODER.
APPLICATION FILED MAY 8, 1911.

1,152,619.

Patented Sept. 7, 1915.
3 SHEETS—SHEET 1.

Witnesses
Martin H. Olsen
Robert Dobberman

Inventor
Jeffrey T. Ferres
By Rector, Kibben, Davis & Macauley
His Attys

J. T. FERRES.
BROODER.
APPLICATION FILED MAY 8, 1911.

1,152,619.

Patented Sept. 7, 1915.
3 SHEETS—SHEET 2.

Witnesses
Martin H. Olsen
Robert Dobberman

Inventor
Jeffrey T. Ferres
By Rector, Hibben, Davis & Macauley
His Attys.

J. T. FERRES.
BROODER.
APPLICATION FILED MAY 8, 1911.

1,152,619.

Patented Sept. 7, 1915.
3 SHEETS—SHEET 3.

Witnesses
Martin H. Olsen.
Robert Dobberman

Inventor
Jeffrey T. Ferres
By Rector, Hibben, Davis & Macauley
His Attys.

UNITED STATES PATENT OFFICE.

JEFFREY T. FERRES, OF ANDERSON, INDIANA, ASSIGNOR TO THE SEFTON MANUFACTURING COMPANY, OF ANDERSON, INDIANA, A CORPORATION OF INDIANA.

BROODER.

1,152,619.   Specification of Letters Patent.   Patented Sept. 7, 1915.

Application filed May 8, 1911. Serial No. 625,893.

*To all whom it may concern:*

Be it known that I, JEFFREY T. FERRES, a citizen of the United States, residing at Anderson, in the county of Madison and State of Indiana, have invented certain new and useful Improvements in Brooders, of which the following is a specification.

My invention relates to what are known as brooders for chicks and the object thereof is to produce a novel and efficient device of this character, preferably made from double-faced corrugated paper board and capable of being collapsed into flat form for shipment and storage purposes.

Speaking in general terms my brooder comprises a box-body in which is arranged a false top from which the hover-strips depend and which is adapted to provide for a circulation of air from the interior of the box into the space above the false top from which the air escapes through suitable openings, thereby preventing any draft in the box which might cause injury to the chicks. In addition one or more strips made into U form are provided for yards in connection with the box-body, these strips being adjustably secured by suitable devices against the outer faces of two of the opposite side walls of the box. When these yard-strips are in their innermost position, they serve to close the side openings in the box through which the chicks pass. The entire structure including the yard-strips and the box with its false top therein are so constructed that they may be collapsed into comparatively small compass, the same being shipped or stored in that condition.

My brooder embodies other novel and advantageous features which will be apparent from the description hereinafter given.

Figure 1:
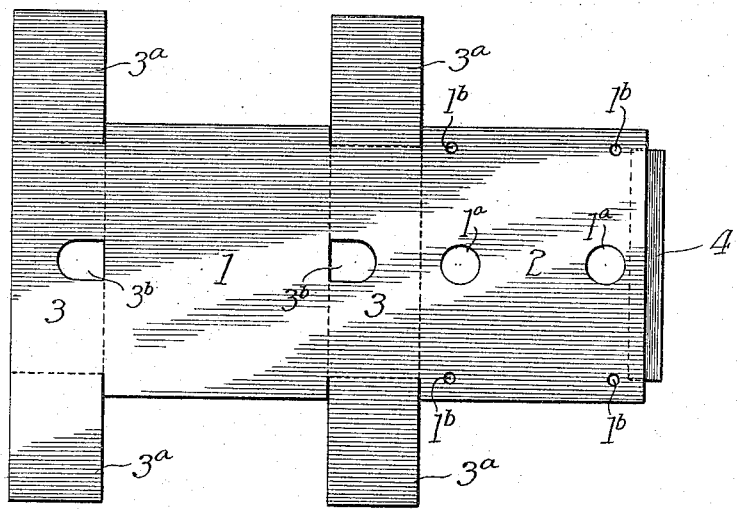
Figure 2:
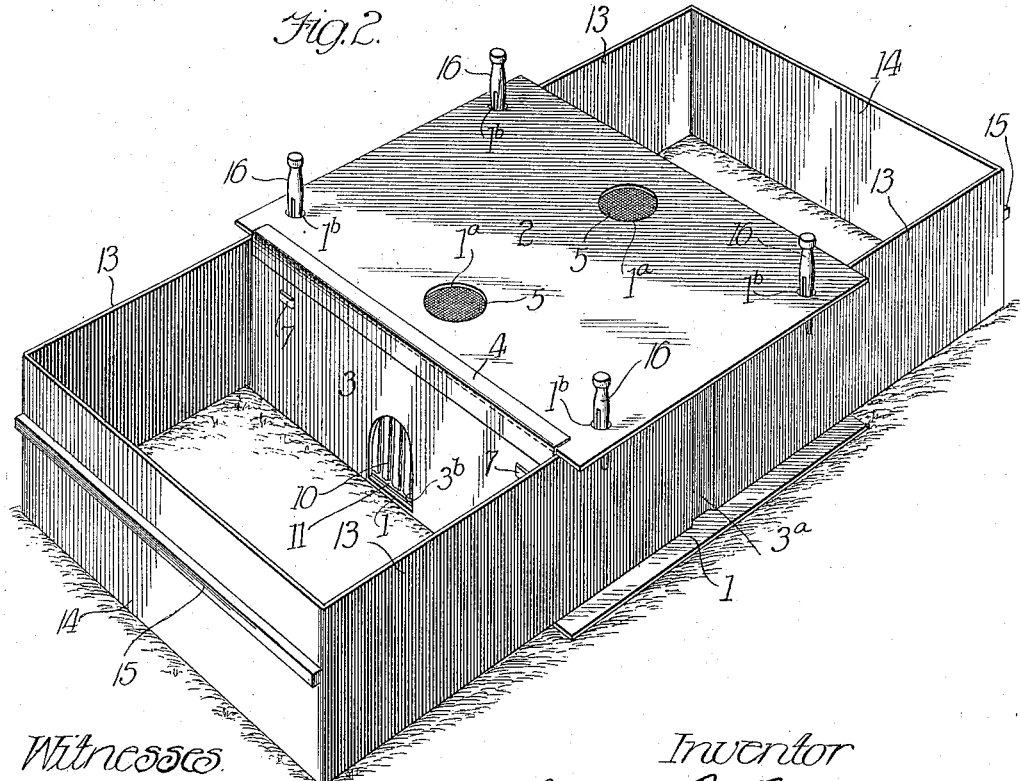
Figure 3:
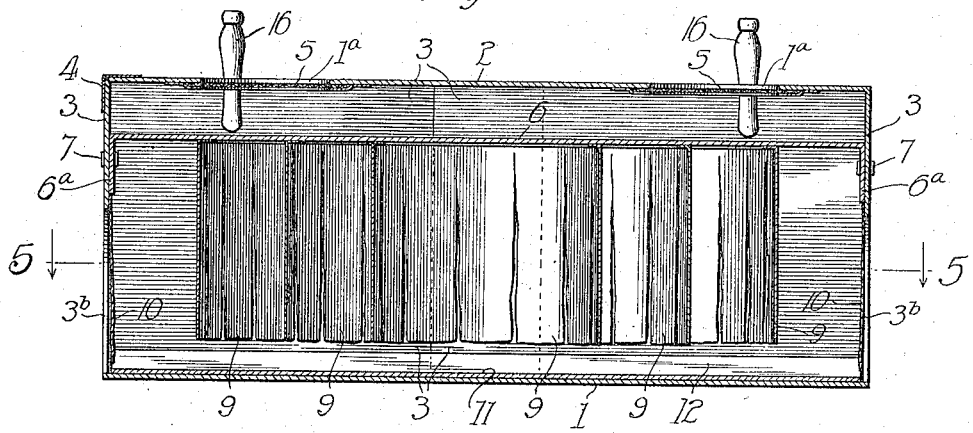
Figure 4:
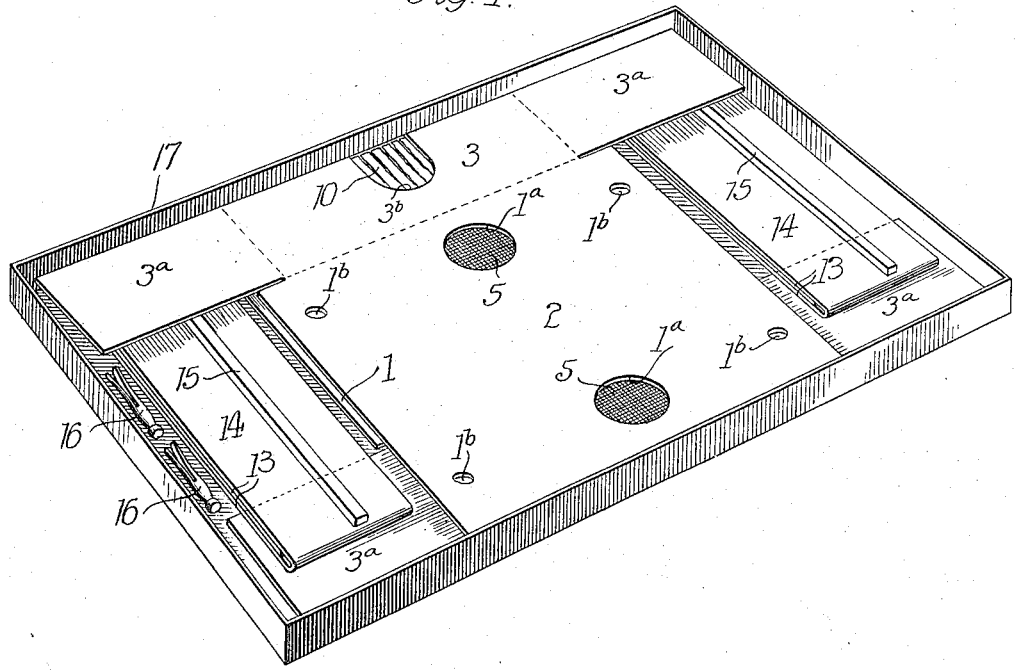
Figure 5:
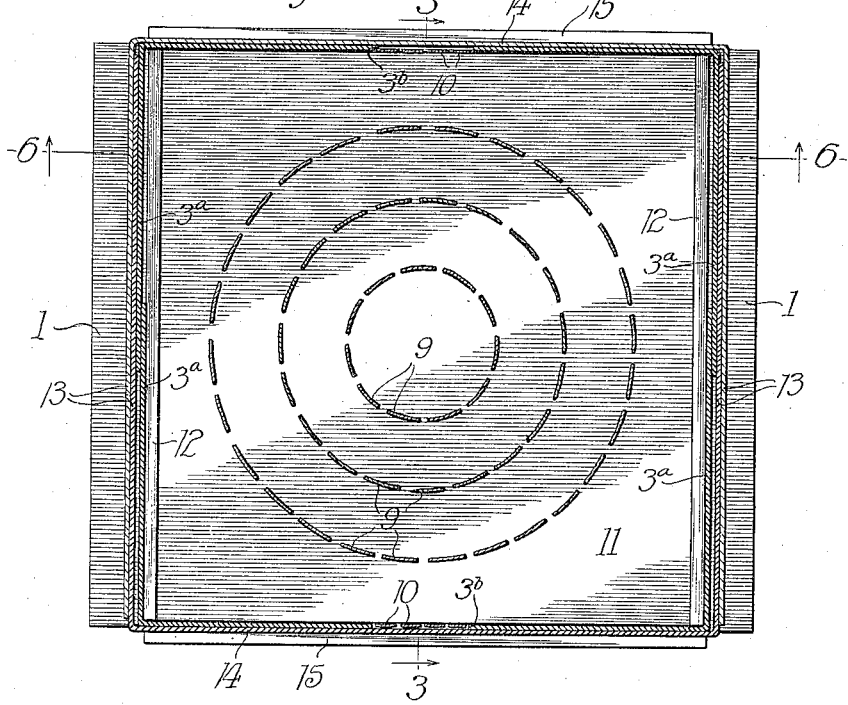
Figure 6:
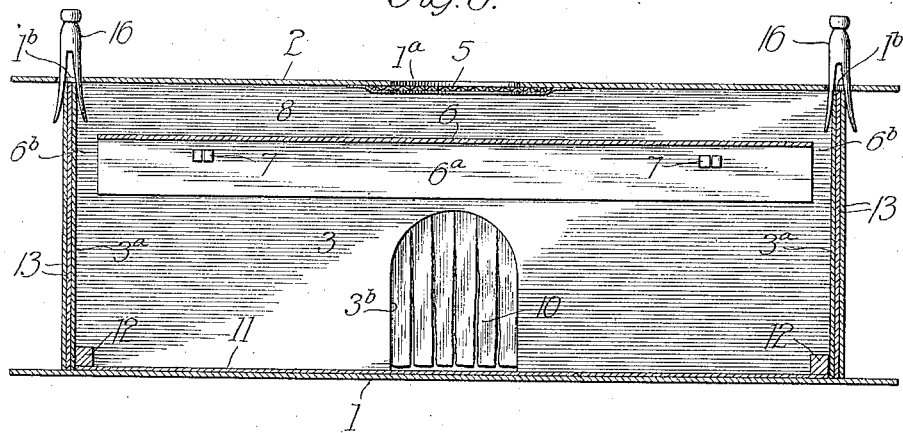

In the drawings Figure 1 is a plan view illustrating a blank from which the box-body is formed; Fig. 2 a perspective of my brooder showing the same in connection with two strips for forming yards at opposite sides of the box; Fig. 3 a section on the line 3—3 of Fig. 5; Fig. 4 a perspective of the box and yard-strips in their collapsed form, the same being shown within the lower half of a shipping box; Fig. 5 a sectional plan view on the line 5—5 of Fig. 3 and Fig. 6 a sectional elevation on the line 6—6 of Fig. 5.

Referring to the particular embodiment of my invention as herein shown and without limiting myself to the specific character thereof, the box-body is preferably made of double-faced corrugated paper board and either from a single piece or blank or two or more pieces hingedly connected together. In the present instance, however, I have shown the box-body as being made of a single piece blank as illustrated in Fig. 1 the same being cut and scored to form a bottom 1, top 2, and two similar opposite side-walls 3—3, each of which has hinged to its opposite ends the extensions or flaps $3^a$ which when folded inwardly in pairs form the other two opposite side-walls. As indicated in Fig. 1 a pasting strip 4 is used for hingedly connecting the free outer edge of the top 2 with the outer free edge of the side-wall 3. When the box made from such a blank is assembled into form, there is produced a box-body having a bottom 1, a top 2, two opposite side-walls 3—3 and two other opposite side-walls formed by the flaps $3^a$ which by preference are of such length as to somewhat overlap each other. The two side-walls 3—3 are provided with door openings $3^b$ through which the chicks may pass and the top of the box is provided with one or more ventilation openings $1^a$, such openings being two in number in the present instance and by preference. I provide these ventilation openings with screens 5, in order to prevent the entrance of rodents particularly weasels, without obstructing the passage of air through such openings.

Within the box-body is arranged a false top which consists of a strip 6 preferably of the same material as the box-body and having at two of its opposite edges the flaps or extensions $6^a$ which are turned downwardly and secured to the two opposite side-walls 3 in any suitable manner as by means of staples 7. This strip is, as to its other two sides somewhat shorter than the box as clearly indicated in Fig. 6 in order to provide air spaces or passages $6^b$ at opposite ends of the box for the circulation of the air from the interior of such box and upward around the ends of said strip or false top 6 and into the air space 8 at the upper end of the box body from which the air finally escapes or passes through the openings $1^a$. While it is preferred to locate these openings in the top member of the box yet it will be understood that they may be located elsewhere so long as they communicate with the space 8. In this manner and by these means I provide for a proper circulation of the air without in any way endangering the chicks within. This false top also serves to hold the hover-strips 9 which depend from the underside thereof and extend downwardly to near the bottom of the box. These strips may be made of any suitable material such as Canton flannel. Similar strips 10 are preferably hung in the door openings 3ᵇ of the box.

By preference I provide a removable bottom consisting of a strip 11 preferably having at two opposite end edges cross-pieces or cleats 12 of any suitable material and preferably of wood. This bottom forms a removable bottom or tray which can be sprinkled with sand, saw-dust or any other such material and which can be readily removed for cleaning purposes by withdrawing the same through one of the sides formed by the flaps 3ᵃ.

The yards or inclosures in which the chicks may run are formed of strips preferably of the same material as the box, that is double-faced corrugated paper board and are adapted to be held in adjusted positions relative to the box. While I have shown two of said strips forming yards in opposite sides of the box, it will be understood that only one of said strips forming a single yard or inclosure may be used if desired and also that if two of such strips are provided, only one of them may be used at a time. Inasmuch as both of these yard-strips are similar in construction and formation a description of one will suffice for both. Each strip is formed or bent into three parts or portions into the U form clearly illustrated in Fig. 2 the same comprising the two parallel parts or portions 13 and the connecting part or portion 14. While as shown and by preference the yard strips are made from a single piece or blank yet it will be understood that they may be made of separate pieces hingedly connected in a suitable manner. The parts 13 of the strip are of such height as to properly fit between the extended ends of the top and bottom of the box, the same being of substantially the same height as the side walls of the box. These parts of the yard strips are adapted to slide against the side walls formed by the flaps 3ᵃ and the same overlap the corresponding parts of the other or opposing yard strip when such strips are both in their innermost position. By sliding the yard strip inwardly or outwardly with respect to the box the size of the yard or inclosure may be varied at will and when such strips are in their innermost position they serve to close the door-ways 3ᵇ of the box. For convenience in operating these yard strips and for strengthening the same I provide the connecting part 14 with a suitable cross-strip 15 preferably of wood. In order to hold the yard strips in any adjusted position, suitable means may be employed. In the present instance such means consists of clothespins 16 which are selected because they are always at hand and readily serve the purpose. These clothespins are passed through openings 1ᵇ located in the top of the box near the outer edges and immediately above the parts 13 of the yard strips and also the flaps 3ᵃ of the box body, with the result that when such pins are inserted in place they grip and bind together the yard strips and the said side walls of the box. These fastening devices are also used by preference when the yard strips are in their innermost position in order to retain them in such position.

The brooder above described is thus of comparatively simple construction and can be very readily operated, besides which it is so constructed as to provide for proper ventilation and also to provide for collapsing into flat form so that it can be brought into small compass for storage or shipment. In particular the false top is so located and secured to the box body that the entire structure can be properly collapsed. Furthermore the yard strips are made collapsible so as to be readily packed in flat form with the remainder of the brooder, all as indicated in Fig. 4 wherein the entire brooder is shown in collapsed form ready for shipment within a shipping box indicated at 17, it being understood that the package is ready for shipment when a cover (not shown) is applied to the shipping box.

I claim:

1. A collapsible brooder formed of paper board and comprising a collapsible rectangular box body having a ventilation opening and an opening for the chicks, a rectangular false top narrower in one dimension than such box body to permit circulation of air past its side edges from the interior to the space above it and thence through said ventilation opening, said top being hingedly secured at its opposite ends to the box body, whereby the entire box body and said top may be collapsed together.

2. A collapsible brooder formed of paper board and comprising a collapsible rectangular box body having a ventilation opening and an opening for the chicks, a false rectangular top narrower in one dimension than such box body to permit circulation of air past its side edges from the interior to the space above it and thence through said ventilation opening, said top consisting of a body piece and flaps hinged to its opposite ends, whereby the entire box body and said top may be collapsed together, and means for securing said flaps to two opposite sides of the box body.

3. In a brooder, the combination of a box body composed of top, bottom, and side walls connected together, the top being constructed to extend beyond the outermost walls of the brooder structure at two opposite sides and form projecting flanges overhanging said side walls, a three part strip to form a yard, two of which parts are arranged parallel to each other and adapted to slide along the outer side of said last mentioned two sides of the box and below the overhanging flange portion of the top, and means for holding said strip in any adjusted position relative to the box.

4. In a brooder, the combination of a box body composed of top, bottom, and side walls connected together, the top being constructed to overhang the side walls on two of the sides, a three part strip to form a yard, two of which parts are arranged parallel to each other and adapted to slide along the outer side of said last mentioned two sides of the box and below the overhanging portion of the top, said top having apertures in said overhanging part, and detachable fastening devices passing through said apertures and engaging the parallel parts of said strip and the adjacent side walls of the box for holding said strip in any adjusted position relative to the box.

5. In a brooder, the combination of a box body composed of top, bottom, and side walls connected together, the top being constructed to extend beyond the outermost walls of the brooder structure at two opposite sides and form projecting flanges overhanging said side walls; a three part strip to form a yard, two of which parts are arranged parallel to each other and adapted to slide along the outer side of said last mentioned two sides of the box and below the overhanging flange portion of the top, said box body having a side opening for the chicks adapted to be closed by said strip in its innermost position, and means for holding said strip in any adjusted position relative to the box.

6. In a brooder, the combination of a box body composed of top, bottom and side walls connected together, the top and bottom both being extended outwardly beyond two opposite side walls to form projecting top and bottom flanges, a strip having three portions made into U-shape form, the parallel portions being arranged to slide between the extended flange portions of the top and bottom of the box, and means for holding said parallel portions of the strip in adjusted position relative to the box body.

7. In a brooder, the combination of a box body composed of top, bottom and side walls connected together, the top and bottom both being extended outwardly beyond two opposite side walls to form projecting top and bottom flanges, a strip having three portions made into U-shape form, the parallel portions being arranged to slide between the extended flange portions of the top and bottom of the box, and means for clamping said parallel portions of the strip to the adjacent side walls of the box.

8. In a brooder, the combination of a box body composed of top, bottom and side walls connected together, the top and bottom both being extended outwardly as to two opposite sides beyond the lines of the adjacent side walls, a strip having three portions made into U-shape form, the parallel portions being arranged to slide between the extended portions of the top and bottom of the box, said box top having openings 1$^b$, and fastening devices passing through said openings and engaging and clamping together said parallel portions of the strip to the adjacent side walls.

9. In a brooder, the combination of a box body composed of top, bottom and side walls connected together, two of the opposite side walls being made in sections, each of which is hinged to its adjacent wall of the other two side walls, and a three-part strip to form a yard, two of which parts are arranged parallel to each other and adapted to slide along the outer faces of said side walls which are in sections, said box body having a side opening adapted to be closed by said strip when in its innermost position, and means for holding said strip in any adjusted position relative to the box, the ends of the top and bottom of the box extending on opposite sides of the box body outwardly beyond the side walls which are in sections to form projecting flanges above and below such side walls.

10. In a brooder, the combination of a box body composed of top 1, bottom 2, two opposite sides 3, 3 which are hinged to both the top and bottom, and two opposite sides which are each composed of two sections 3$^a$ overlapping when the box body is erected, and a strip comprising the parallel parts 13 and cross part 14, said strip being adapted to fit against and to slide along the outer faces of said sections 3$^a$, one of said walls 3 having an opening 3$^b$ adapted to be closed by the part 14 in the latter's innermost position, and means for holding said strip in any adjusted position relative to the box, the ends of the top and bottom of the box extending on opposite sides of the box body outwardly beyond the side walls which are in sections to form projecting flanges above and below such side walls.

JEFFREY T. FERRES.

Witnesses:
 M. L. VINNEDGE,
 M. L. TWOMLEY.

Copies of this patent may be obtained for five cents each, by addressing the "Commissioner of Patents, Washington, D. C."